US009172789B2

(12) United States Patent
Kruzeniski et al.

(10) Patent No.: US 9,172,789 B2
(45) Date of Patent: Oct. 27, 2015

(54) CONTEXTUAL SEARCH BY A MOBILE COMMUNICATIONS DEVICE

(71) Applicant: Rovi Technologies Corporation, Santa Clara, CA (US)

(72) Inventors: Michael J. Kruzeniski, Seattle, WA (US); Darren A. Apfel, Redmond, WA (US); Jonathan D. Friedman, Mercer Island, WA (US); Kathleen W. Holmes, Bellevue, WA (US); David Henry Wykes, Seattle, WA (US)

(73) Assignee: Rovi Technologies Corporation, Santa Clara, CA (US)

( * ) Notice: Subject to any disclaimer, the term of this patent is extended or adjusted under 35 U.S.C. 154(b) by 0 days.

(21) Appl. No.: 14/339,186

(22) Filed: Jul. 23, 2014

(65) Prior Publication Data
US 2015/0026157 A1 Jan. 22, 2015

Related U.S. Application Data

(63) Continuation of application No. 12/433,605, filed on Apr. 30, 2009, now Pat. No. 8,825,699.

(60) Provisional application No. 61/107,921, filed on Oct. 23, 2008, provisional application No. 61/107,945, filed on Oct. 23, 2008, provisional application No. 61/107,935, filed on Oct. 23, 2008.

(51) Int. Cl.
H04M 1/725 (2006.01)
G06F 3/0482 (2013.01)
G06F 3/0488 (2013.01)
G06F 17/30 (2006.01)
G06Q 30/04 (2012.01)
(Continued)

(52) U.S. Cl.
CPC ........... *H04M 1/7258* (2013.01); *G06F 3/0219* (2013.01); *G06F 3/041* (2013.01); *G06F 3/0482* (2013.01); *G06F 3/0485* (2013.01); *G06F 3/0488* (2013.01); *G06F 3/04883* (2013.01); *G06F 17/30864* (2013.01); *G06F 17/30867* (2013.01); *G06Q 30/04* (2013.01); *G06Q 30/0601* (2013.01); *H04M 1/72569* (2013.01); *H04M 1/72583* (2013.01); *G06F 3/0202* (2013.01); *G06F 2203/04807* (2013.01); *H04W 4/02* (2013.01); *H04W 8/245* (2013.01); *H04W 64/00* (2013.01); *H04W 72/04* (2013.01)

(58) Field of Classification Search
CPC .................................................. G06F 17/30864
USPC .......................................................... 707/770
See application file for complete search history.

(56) References Cited

U.S. PATENT DOCUMENTS

2006/0271520 A1    11/2006  Ragan
2007/0050346 A1*   3/2007   Goel et al. ......................... 707/3
(Continued)

FOREIGN PATENT DOCUMENTS

JP        2005/080139     3/2005
WO    WO 2006/014835    2/2006

*Primary Examiner* — Alexey Shmatov
(74) *Attorney, Agent, or Firm* — Ropes & Gray LLP

(57) ABSTRACT

Contextual search by a mobile communications device is described. In an implementation, a search query is a received and a context is detected of a user interface currently being displayed on a display device of a mobile communication device. One or more search results are displayed on a display device of a search performed in the detected context using the search query.

18 Claims, 10 Drawing Sheets

(51) Int. Cl.
  *G06Q 30/06*   (2012.01)
  *G06F 3/041*   (2006.01)
  *G06F 3/0485*  (2013.01)
  *G06F 3/02*        (2006.01)
  *H04W 4/02*        (2009.01)
  *H04W 8/24*        (2009.01)
  *H04W 64/00*       (2009.01)
  *H04W 72/04*       (2009.01)

(56) References Cited

U.S. PATENT DOCUMENTS

| | | | |
|---|---|---|---|
| 2007/0067272 A1* | 3/2007 | Flynt et al. | 707/3 |
| 2007/0067726 A1 | 3/2007 | Flynt et al. | |
| 2008/0033919 A1 | 2/2008 | Arrouye et al. | |
| 2008/0074399 A1 | 3/2008 | Lee | |
| 2008/0122796 A1* | 5/2008 | Jobs et al. | 345/173 |

* cited by examiner

900 ⟶

902
Display search results of a first search performed in a first context based on a search query

↓

904
If an input is received via a button of the mobile communications device that indicates that a scope of the first search is to be expanded, perform a second search that includes a second context that was not part of the first search, the second search being performed without manual reentry of the search query

*Fig. 9*

CONTEXTUAL SEARCH BY A MOBILE COMMUNICATIONS DEVICE

RELATED APPLICATIONS

This application is a continuation of U.S. patent application Ser. No. 12/433,605, filed Apr. 30, 2009, which claims priority under 35 U.S.C. Section 119(e) to U.S. Provisional Patent Applications Nos. 61/107,945, 61/107,935, and 61/107,921, each of which was filed on Oct. 23, 2008, The aforementioned, earlier-filed applications are hereby incorporated by reference herein in their entireties.

BACKGROUND

Mobile communication devices (e.g., wireless phones) have become an integral part of everyday life. For example, a user traditionally used a mobile communications device to make telephone calls when the user was away from a fixed communications device, e.g., a house or office wired telephone. In some instances, the mobile communications device became the primary device via which the user communicated with other users as the user became accustomed to the convenience and functionality of the device.

Communication techniques that may be employed using a mobile communications device have also increased. For example, users were traditionally limited to telephone calls between mobile communications devices. Advances were then made to provide a variety of other communication techniques, e.g., text messaging and email. However, inclusion of these additional communication techniques on mobile communications devices having traditional form factors may cause these devices to become unwieldy and less suitable for mobile applications. For example, traditional input devices that were employed by these communication techniques may be less suitable when applied by traditional mobile communications devices.

SUMMARY

Contextual search by a mobile communications device is described. In an implementation, a search query is received and a context is detected of a user interface currently being displayed on a display device of a mobile communications device. One or more search results are displayed on a display device in a search performed in the detected context using the search query.

In an implementation, a mobile communications device includes a display device and one or more modules to cause display of one or more results on the display device of a search performed in a first context based on a search query. If a gesture is detected to switch from the first context to a second context, the modules are configured to cause display of one or more results of a search performed in the second context based on the search query.

In an implementation, a mobile communications device includes a display device and one or more modules to display search results on the display device of a first search performed in a first context based on a search query. If an input is received via a button of the mobile communications device that indicates that a scope of the first search is to be expanded, the modules are configured to perform a second search that includes a second context that was not part of the first search, the second search being performed without manual reentry of the search query.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 3 illustrates an example implementation of loading search results by the mobile communications device of FIG. 1.

FIG. 9 is a flow diagram depicting a procedure in an example implementation, in which a search is scoped out to include an additional context.

DETAILED DESCRIPTION

Figure 1:
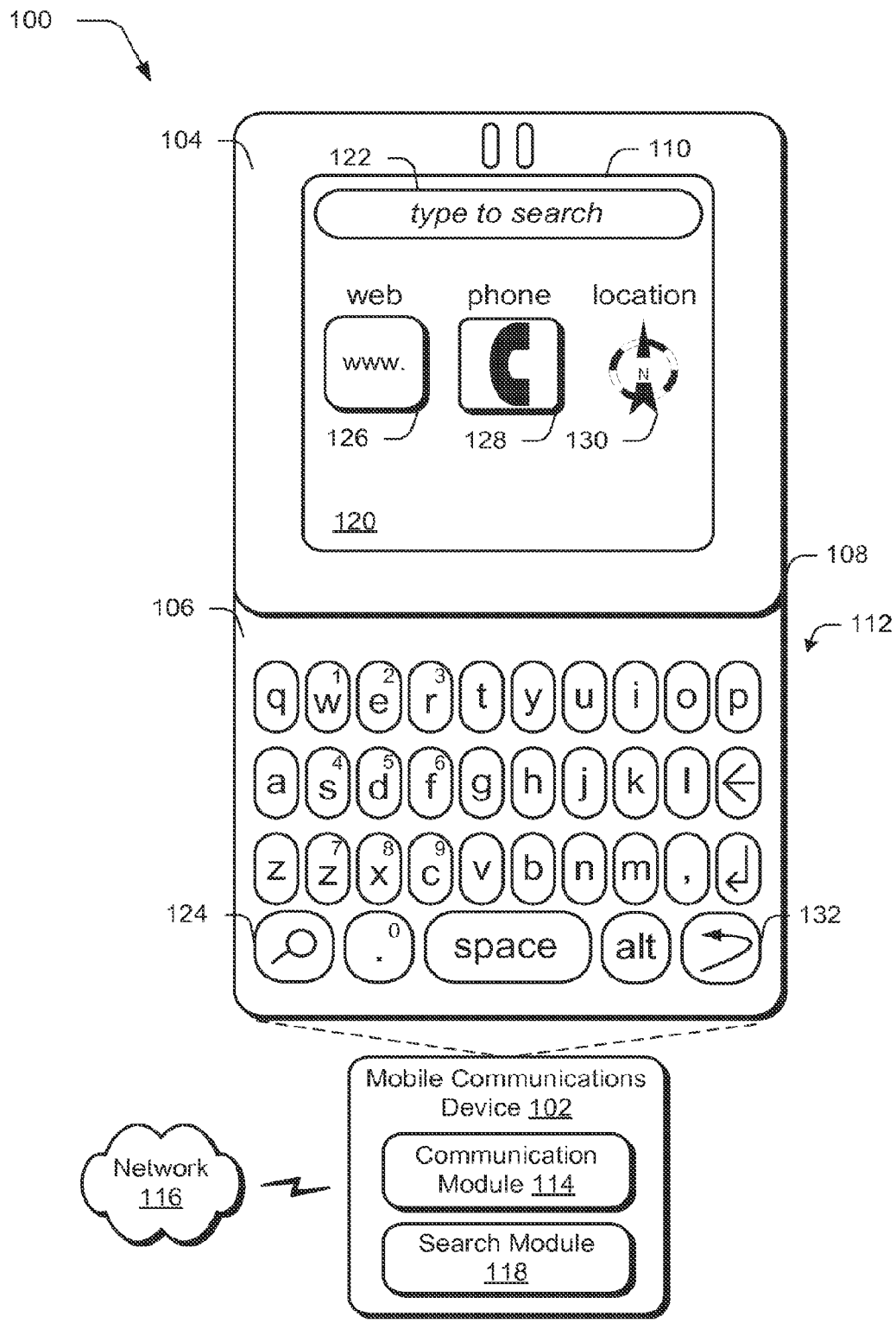
FIG. 1 is an illustration of an example implementation of a mobile communications device in accordance with one or more embodiments of devices, features, and systems for mobile communications.

Functionality is continually added to mobile communications devices (e.g., mobile phones), such as to consume music, store contacts, communicate via messages (e.g., SMS, MMS, email), consume streamed content (e.g., music and videos), and so on. Because of this, it is becoming progressively harder for users to find desired content stored on the mobile communications device. Additionally, because mobile communications devices are typically connected to a network, a user may desire content that is not stored locally on the mobile communications device but rather is accessible via the network.

Techniques are described to provide contextual search on a mobile communications device. These techniques may be implemented in a variety of ways to provide a variety of features. For example, a physical search button may be included with a keyboard of the mobile communications device to invoke a search. In this way, the search may be invoked throughout a user interface of the mobile communications device (e.g., by different applications throngs an API)

without consuming display area of the mobile communications device by display of a search input area when the search is not desired.

Contextual filtering of search results may also be performed based on context of a current output of a user interface by the mobile communications device. For example, a search may be performed for music when a music application is currently output in the user interface by the mobile communications device. Thus, in this example the music application provides the context to the search.

In an implementation, a context may be switched without reentering the search criteria, e.g., by performing a panning gesture, pressing a button of the mobile communications device, and so on. For example, a pan gesture may be defected via a display device to mimic switching from a phone context accessible via a particular column in a user interface to a web context accessible via an adjacent column in the user interface. Additionally, a search may be "scoped out" of a particular context, e.g., may increase a scope of the search from music, to an entirety of a mobile communications device, and even beyond the bounds of the mobile communications device to the Internet. Further discussion of contextual search may be found in relation to the following sections.

In the following discussion, a variety of example implementations of a mobile communications device (e.g., a wireless phone) are described. Additionally, a variety of different functionality that may be employed by the mobile communications device is described for each example, which may be implemented in that example as well as in other described examples. Accordingly, example implementations are illustrated of a few of a variety of contemplated implementations. Further, although a mobile communications device having one or more modules that are configured to provide telephonic functionality are described, a variety of other mobile devices are also contemplated, such as persona) digital assistants, mobile music players, dedicated messaging devices, portable game devices, netbooks, and so on.

Example Implementations

FIG. 1 is an illustration of an example implementation 100 of a mobile communications device 102 in accordance with one or more embodiments of devices, features, and systems for mobile communications. The mobile communications device 102 is operable to assume a plurality of configurations, examples of which include a configuration in which the mobile communications device 102 is "closed" and a configuration illustrated in FIG. 1 in which the mobile communications device 102 is "open."

The mobile communications device 102 is further illustrated as including a first housing 104 and a second housing 106 that are connected via a slide 108 such that the first and second housings 104, 106 may move (e.g., slide) in relation to one another. Although sliding is described, it should be readily apparent that a variety of other movement techniques are also contemplated, e.g., a pivot, a hinge and so on.

The first housing 104 includes a display device 110 that may be used to output a variety of data, such as a caller identification (ID), information related to text messages as illustrated, email, multimedia messages, Internet browsing, game play, music, video and so on. In the illustrated implementation, the display device 110 is also configured to function as an input device by incorporating touchscreen functionality, e.g., through capacitive, surface acoustic wave, resistive, optical, strain gauge, dispersive signals, acoustic pulse, and other touchscreen functionality.

The second housing 106 is illustrated as including a keyboard 112 that may be used to provide inputs to the mobile communications device 102. Although the keyboard 112 is illustrated as a QWERTY keyboard, a variety of other examples are also contemplated, such as a keyboard that follows a traditional telephone keypad layout (e.g., a twelve key numeric pad found on basic telephones), keyboards configured for other languages (e.g., Cyrillic), and so on.

In the example shown in FIG. 1, the first and second housings 104, 106 of the mobile communications device 102 are approximately squared. For example, a plane defined by an outer surface of the display device 114 may be parallel to a plane of the first housing 104 that approximates a square, which may be the same as or different from the plane defined by the display device 110. In other words, the width and height of the plane taken from the first housing 104 that is parallel to the other surface of the display device 110 is approximately one-to-one. Likewise, the second housing 106 may be considered square along a plane that is parallel to and/or is the same as an outer surface of the keyboard 112 disposed within the second housing 106.

The mobile communications device 102 may assume a "closed configuration" such that the first housing 104 covers the second housing 106 by sliding the housing together using the slide 108. Consequently, the keyboard 112 disposed on the second housing 106 may be covered and made not available to for interaction by a user of the mobile communications device 102. In an implementation, telephonic functionality is still available when the mobile communications device 102 is in the closed configuration, e.g., to receive a telephone call.

In the "open" configuration as illustrated in the example implementation 100 of FIG. 1, the first housing 104 is moved (e.g., slid) "away" from the second housing 106 using the slide 108. In this example configuration, at least a majority of the keys of the keyboard 112 (i.e., the physical keys) is exposed such that the exposed keys are available for use to provide inputs. The open configuration results in an extended form factor of the mobile communications device 102 as contrasted with the form factor of the mobile communications device 102 in the closed configuration. In an implementation, the planes of the first and second housings 104, 106 that are used to define the extended form factor are parallel to each other, although other implementations are also contemplated, such as a "clamshell" configuration, "brick" configuration, and so on.

The form factor employed by the mobile communications device 102 may be suitable to support a wide variety of features. For example, the keyboard 112 is illustrated as supporting a QWERTY configuration. This form factor may be particularly convenient to a user to utilize the previously described functionality of the mobile communications device 102, such as to compose texts, play games, check email, "surf" the Internet, provide status messages for a social network, and so on.

In the mobile communications device 102 of FIG. 1, a portion of the keys of the keyboard 112 are illustrated as sharing multiple functions. For example, a numeric keypad may be provided within physical keys of the QWERTY layout as illustrated by the physical keys "w", "e", "r", "s", "d", "f", "z", "x", "c", and "." as sharing numbers "1", "2", "3", "4", "5", "6", "7", "8", "9", and "0", respectively. The numbers may be accessed by pressing the "ALT" key of the keypad 112. A variety of other examples are also contemplated, an example of which may be found in relation to tire following figure.

The mobile communications device 102 is also illustrated as including a communication module 114. The communication module 114 is representative of functionality of the mobile communications device 102 to communicate via a network 116. For example, the communication module 114 may include telephone functionality to make and receive telephone calls. The communication module 114 may also include a variety of other functionality, such as to form short message service (SMS) text messages, multimedia messaging service (MMS) messages, emails, status messages for a social network, and so on. A user, for instance, may form a status message for communication via the network 116 to a social network website. The social network website may then publish the status message to "friends" of the user, e.g., for receipt by the friends via a computer, respective mobile communications device, and so on. A variety of other examples are also contemplated, such as blogging, instant messaging, and so on.

The mobile communications device 102 is also illustrated as including a search module 118. The search module 118 is representative of functionality of the mobile communication device 102 to perform a search and generate a user interlace 120. The user interface 120 is illustrated as including a search query input area 122 that is configured to receive a search query.

There are a variety of different ways of initiating a search. For example, an input may be received from the keyboard 112 which causes output of the user interface 120 and input of corresponding letters as a search query in the search query input area 122. In another example, a dedicated physical search button 124 of the keyboard 112 may be pressed to cause output of the user interface 120. A variety of other examples are also contemplated, such as by selecting a representation in a menu displayed on the display device 110 or upon receipt of an input in the search query input area 122 from the keyboard 122 (e.g., when a user starts typing without selecting a specific portion of the user interface 120.

Depending on where the search was initiated, the search module 118 may configure the user interface 120 in a variety of ways. As illustrated in FIG. 1, for instance, the user interface 120 may be output without being scoped to a particular context. In this example, the user interface 120 includes a plurality of portions that are selectable to specify a particular context, illustrated instances include representations of the web 126, a phone 128, and location 130. In another example, the user interface 120 may be scoped to a particular context automatically and without user intervention based on a current context of an output by the mobile communications device 102, further discussion of which may be found in relation to FIG. 7.

In an implementation, if a user starts typing on the keyboard 112 without selecting a context, the phone 128 context is selected by default. This may be represented by an animation that gives an appearance of zooming-in to the phone 128 context icon displayed in the user interface 120.

In another implementation, a user may manually select a context. For example, a user may manually select the representation of the web 126 to cause a web search to be performed. In response to the selection (e.g., by pressing the display device 110 using touchscreen functionality), an animation may be output to animate into that context. As the user enters the search query using the keyboard 112 or other input device, the search module 118 performs the search in the selected context. In an implementation, auto-complete functionality may be used to increase efficiency in entering the search query. A user may also switch contexts (e.g., by panning) used to perform the search after the search query is entered, further discussion of which may be found in relation to the following figure.

Figure 2:
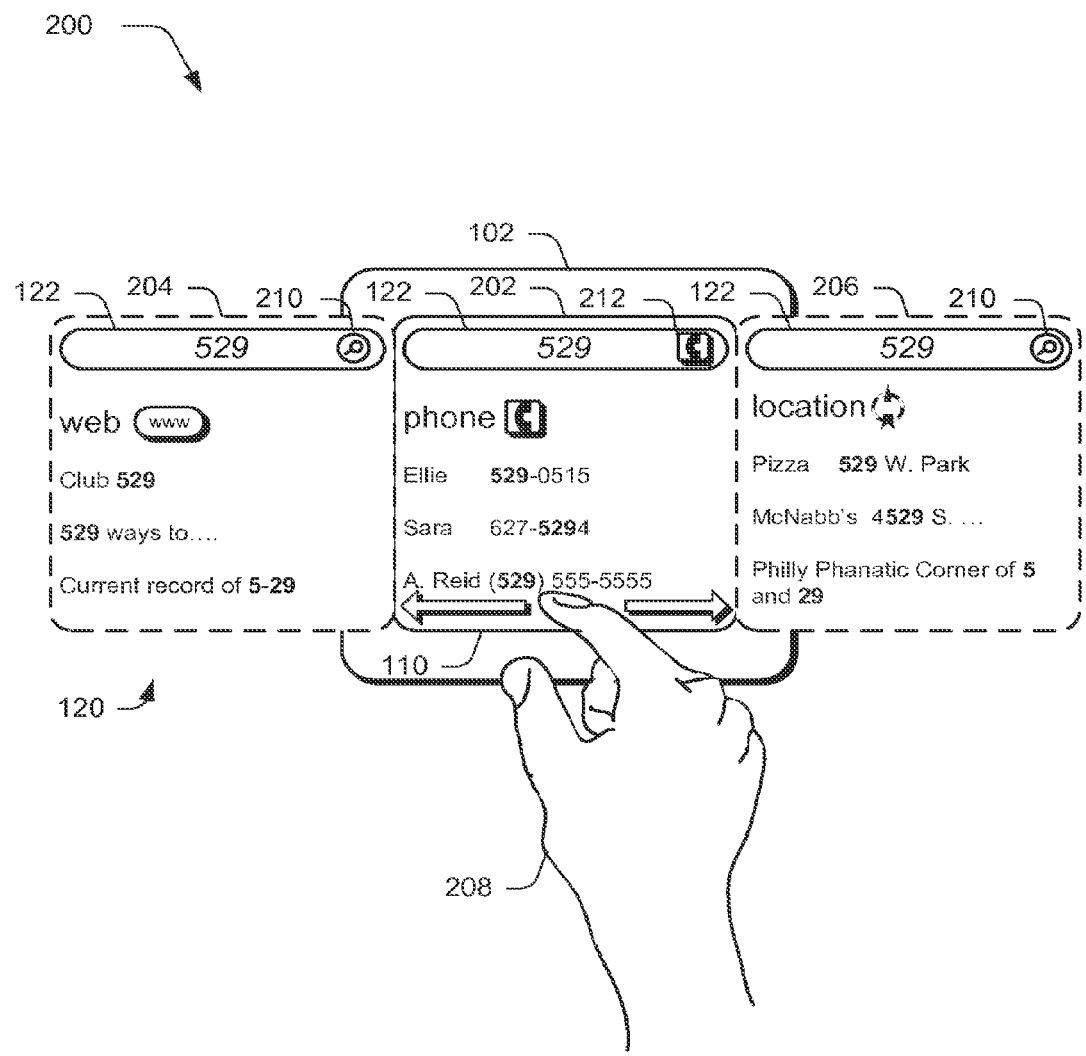
FIG. 2 illustrates an example implementation in which a gesture is utilized to switch a context used to perform a search by the mobile communications device of FIG. 1.

FIG. 2 illustrates an example implementation in which a gesture is utilized to switch contexts used to perform a search by the mobile communications device 102 of FIG. 1. The mobile communications device 102 is illustrated as outputting the user interface 120 on the display device 110. The user interface 120 has three contexts in the illustrated example arranged in columns. A phone context 202 is illustrated as currently being output on the display device 110. A web context 204 and a location context 206 are illustrated as not currently output on the display device 110 (and accordingly are illustrated in phantom) and are arranged in columns to the left and right of the phone context 202, respectively, to indicate "where" the contexts are located in respect to the phone context 202.

The phone context 202 includes the search query input portion 122 having a search query "529". Search results that include telephone number from contacts stored in the mobile communication device 102 are displayed in a column of the phone context 202 below the search query input portico 122. In an implementation, the search results are selectable to initiate a communication (e.g., telephone call) using the contact information. Further, additional content may be searched from the phone 128 context such as applications, data, and so on.

In an implementation, the user may change the context in a variety of ways. For example, a user may navigate between the columns of the user interface 120 using one or more physical buttons of the keyboard 112 of FIG. 1. In another example illustrated in FIG. 2, a gesture may be performed to pan between the columns. For example, a finger of a user's hand 208 may be placed on the display device 110 to "drag" the user interface 120 in the desired direction to switch from the phone context 202 to the web context 204 or the location context 206. In an implementation, the search query is automatically reused to perform a search in the respective context. In this way, a user may perform the search in different contexts without manually reentering the search query in the search query input portion 122. A variety of other examples (e.g., gestures) are also contemplated to switch contexts.

As illustrated in FIG. 2, the search query input area 122 includes a search button 210 that is selectable to initiate a search when in the web 204 and location 210 contexts, but not the phone 202 context. When in the phone 202 context, a dial button 212 is included in the search query input area 122 that is selectable to initiate a telephone call aging numbers and/or letters input in the search query input area 122.

The telephone number may be displayed in the search query input area 122 according to the following logic. If the query starts with a number or a plus sign the dial button 212 is displayed. The telephone number may then disappear when the user enters a small-cap letter that does not correspond to a number. For example, when the user enters a "q" the user interface may display contacts that include a "q." The telephone number may also disappear when the user has entered more than the maximum number of digits for a locale before initiating dialing.

In an implementation, if the user has entered a capitalized letter the letter is translated to a number according to the 12-key digit-letter telephone keypad layout unless it violates one or more of the conditions above. The conditions may be validated each time there is a change in the query string such the telephone number field may appear/disappear as the query changes. The telephone number may be automatically formatted to include a plus sign, dashes and parentheses as appropriate by the communication module 114.

If the context was automatically selected for the user (e.g., by manually selecting the phone 128 context of FIG. 1), deleting each of the inputs in the search query input area 122 may cause the user interface 120 to "zoom out" of the selected context. Additionally, pressing the back button 132 may cause text entered into the search query input area 122 to be erased upon exit of the default context back to a main search screen as illustrated in FIG. 1. In another example, the back button 132 may cause the search to "scope out," further discussion of which may be found in relation to FIG. 9. In an implementation, an input is retained upon exit of a search application (e.g., search module 118) such that the input remains upon re-initiation of the search application until a new input is provided.

Figure 3:
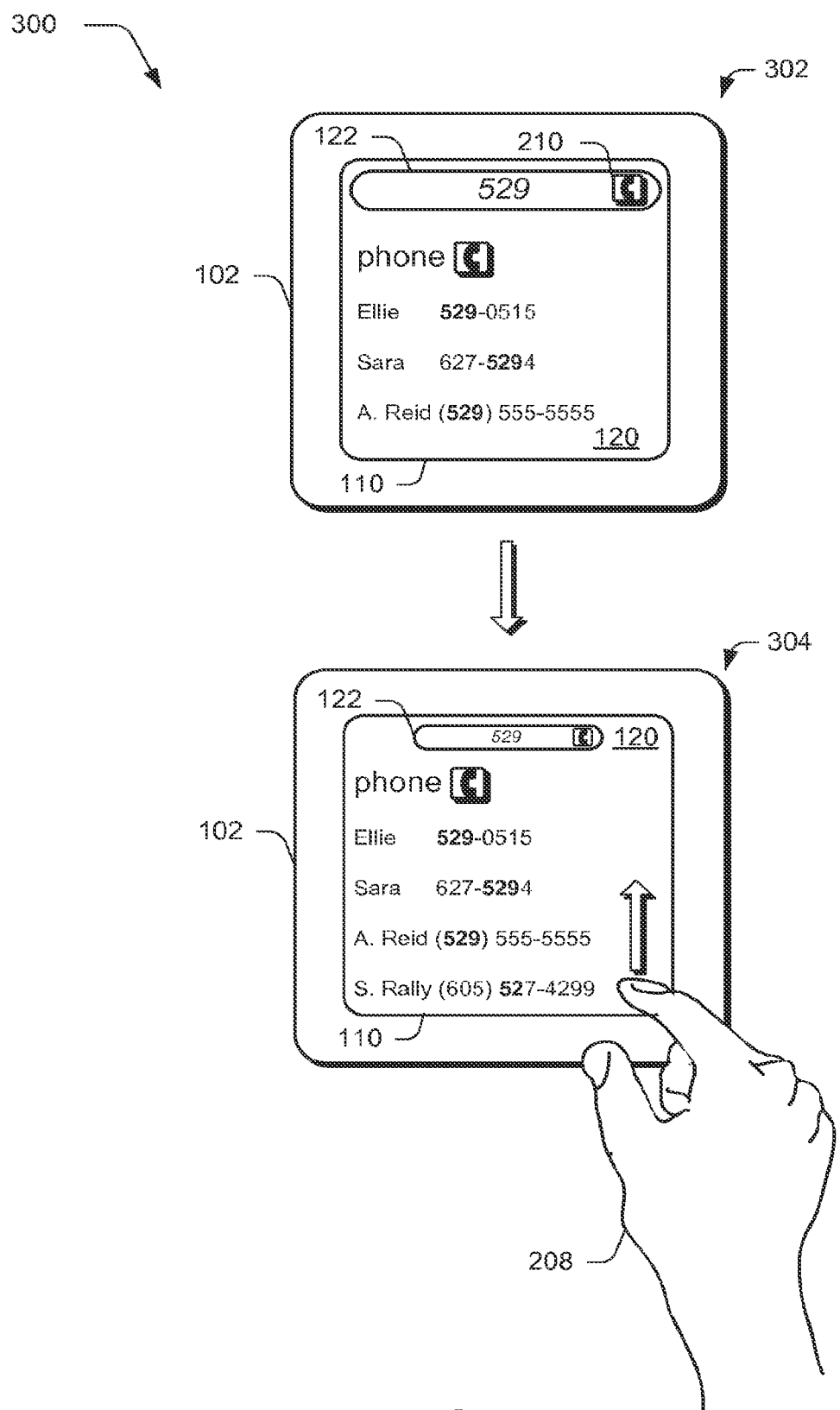
FIG. 3 illustrates an example implementation of a gesture received to scroll (e.g., pan up or down) through the user interface of FIG. 1.

The search query input area 122 may also be configured by the mobile communications device 102 for efficient use of an available amount of display area of the display device 110, an example 300 of such an implementation is illustrated in FIG. 3. The example 300 shows first and second instances 302, 304 of the mobile communications device 102.

In the first instance 302, the search query input area 122 is displayed at a first size (e.g., "full" size) to increase legibility of the search query as the search query is entered. In the second instance 304, however, the search query input area 122 is reduced (e.g., shrunk by thirty percent) in response to an input received from the user 208 to scroll through the search results. For example, as illustrated in FIG. 3 a gesture may be received to scroll (e.g., pan up or down) through the user interface 120. The search query input area 122 may return to the original size as illustrated in the first instance 302 when selected by a user. Thus, a user may scroll through search results vertically as shown in FIG. 3 and switch contexts horizontally as shown in FIG. 2, although it should be readily apparent that a variety of other implementations are also contemplated.

Figure 4:
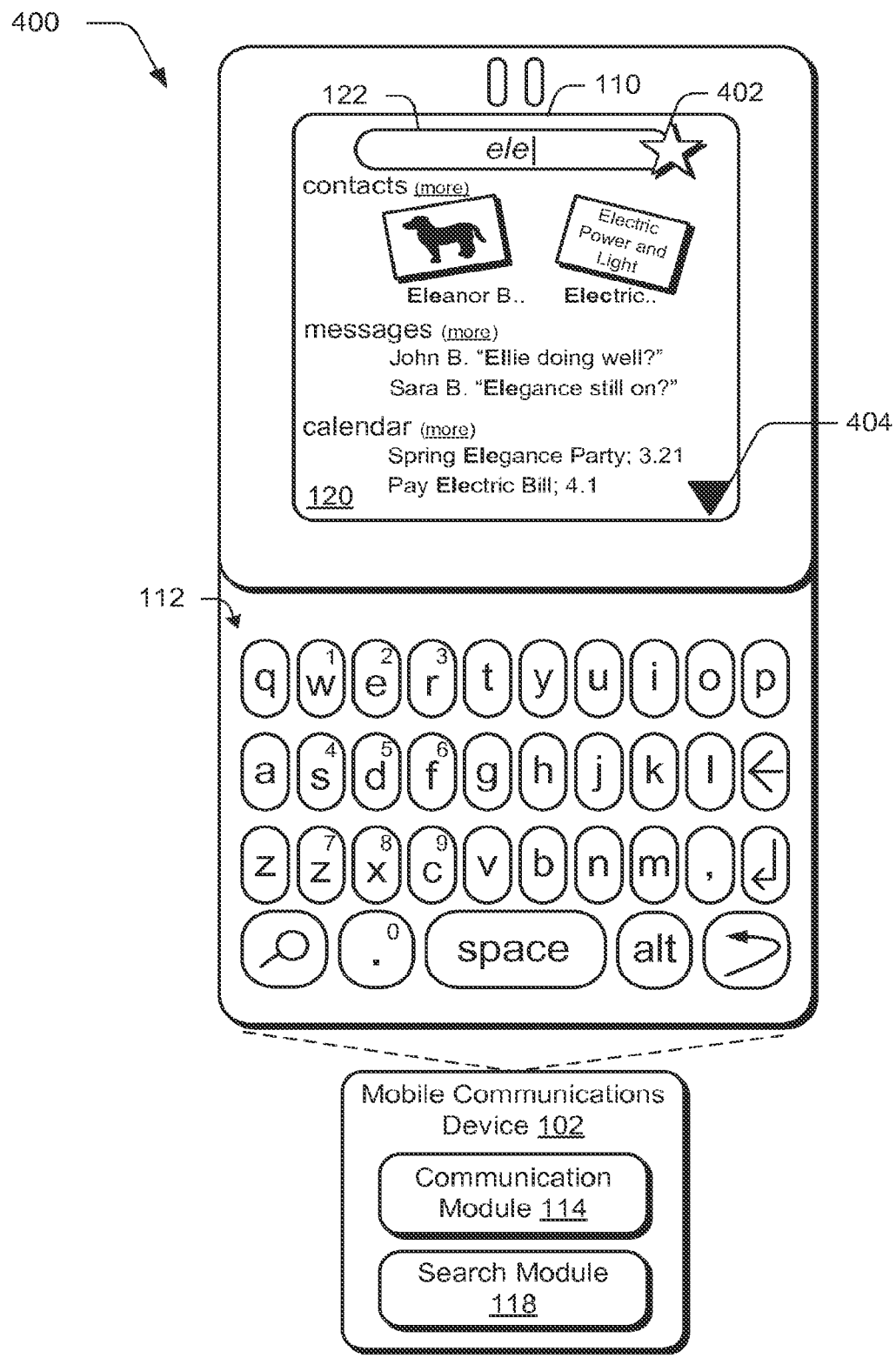
FIG. 4 illustrates an example implementation of the mobile communications device of FIG. 1 as outputting search results in response to a search query.

FIG. 4 illustrates an example implementation of the mobile communications device 102 of FIG. 1 as outputting search results in response to a search query. The riser interface 120 is illustrated as organizing search results into a plurality of sub-categories, examples of which are illustrated as "contacts," "messages," and "calendar" which may or may not correspond to different contexts of a search. In an implementation, each category may have a respective progress indicator to indicate a status of a search within that category, such as by a color change through the text representation of the respective categories that mimics a status bar.

As the search query is being entered in the search query input area 122, the categories may be displayed next to each other. The search results may then be displayed in each respective category as found in real time. A variety of different categories may be supported, examples of which are listed below in a hierarchical arrangement that may be accessed through selecting a "more" button as illustrated for each category.

Web
  Instant answer
    Weather
    Stock
    Movie times
    Encyclopedia entry
  Web pages
  Image
  News
  Phone
  Contacts
  Call history
  Messages
  Favorites
  Media (Music/Video)
  Calendar
  Location
  Businesses In an implementation, the "More" button appears when there are more results than what fits into the first-level results page. When a search is completed, categories that do not contain search results may be removed from the user interface 120. If there are no results in each of the categories, a "No Results" message may be displayed in the user interface 120. Selection (e.g., "tapping") of a search result may cause the search result to be opened, e.g., to open an appointment on the calendar, display a body of a selected message, and so on. In an implementation, a user may interact with the user interface 120 to specify which of the contexts will appear in the user interface. For example, the user may interact with a series of checkboxes to select one or more of the above contexts.

The search module 118 may also support bookmark functionality for search results. For example, a favorites icon 402 (illustrated as a star in the user interface) may be displayed in the user interface 120 once one or more search results are found and displayed in the user interface 120. Selection of the favorites icon 402 may cause the search module 118 to add the search query to a home screen of the user interface 120 of the mobile communications device 102. Selection of the search query in the home-screen may then be used to perform the search again and/or display a previous search result. In an implementation, if the search was performed in a specific context the search is repeated in that context, e.g., one of the columns of FIG. 2.

To view additional search results, a user may perform a gesture to "pan down" through the search results, select a scroll icon 404 (e.g., to scroll down a single page of search results) that is illustrated in a bottom-right corner of the user interface 120, and so on. If there are no additional search results, the scroll icon 404 is not displayed.

In an implementation, a user can scroll through a list of search results. When in a particular context (whether manually or automatically selected), the user may scroll past the "end" of the search results for that context. Scrolling past the end of the context may cause a search to be initiated for at least one other context, e.g., for each local context supported by the mobile communications device 102, for local and remote contexts, and so on. If additional results are not available, the scroll icon 404 may be removed from the user interface 120. In another implementation, the "end" of the search results is indicated by cropping the search results at the bottom of the user interface 120 if there are additional items to imply that the additional items are available to be viewed. If not, the search results at the end are displayed in full, i.e., an icon representing each search result is displayed in its entirety. The search results may also be configured to indicate a number of that search results are loading, further discussion of which may foe found in relation to the following figure.

Figure 5:
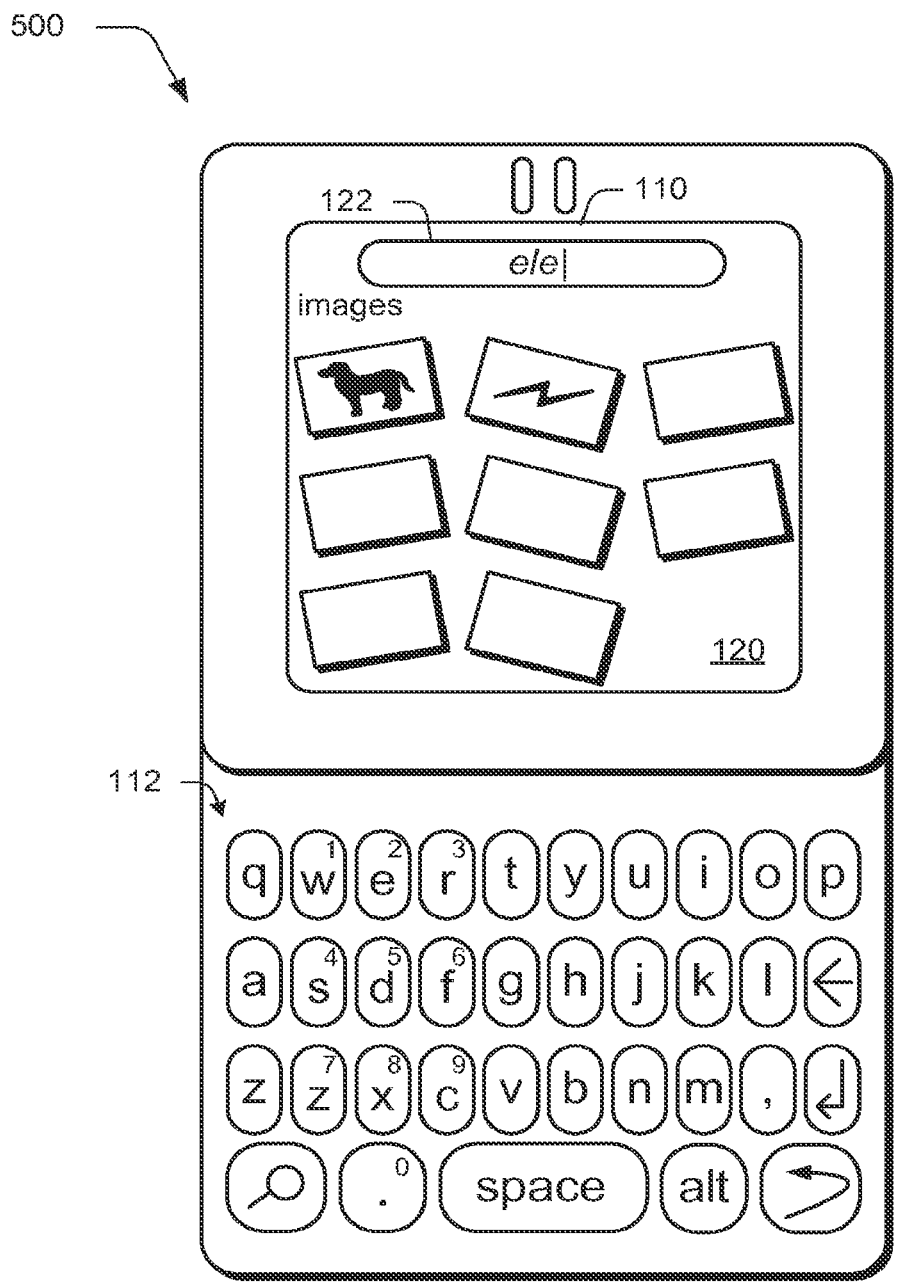

FIG. 5 illustrates an example implementation 500 of loading search results by the mobile communications device 102 of FIG. 1. In this example, the context of the search relates to images. Consequently, images are displayed in the user interface 120 as the search result is entered.

As the search results (e.g., images) are located, for instance, representations of the images are displayed in the user interface, examples of which include a dog and a bolt of electricity. Outlines of other images are displayed to indicate a number of search results found. These outlines may then be "filled in" as the images are loaded into the user interface 120. A variety of other techniques are also contemplated to indicate a number of search results as found and loading of the search results.

Figure 6:
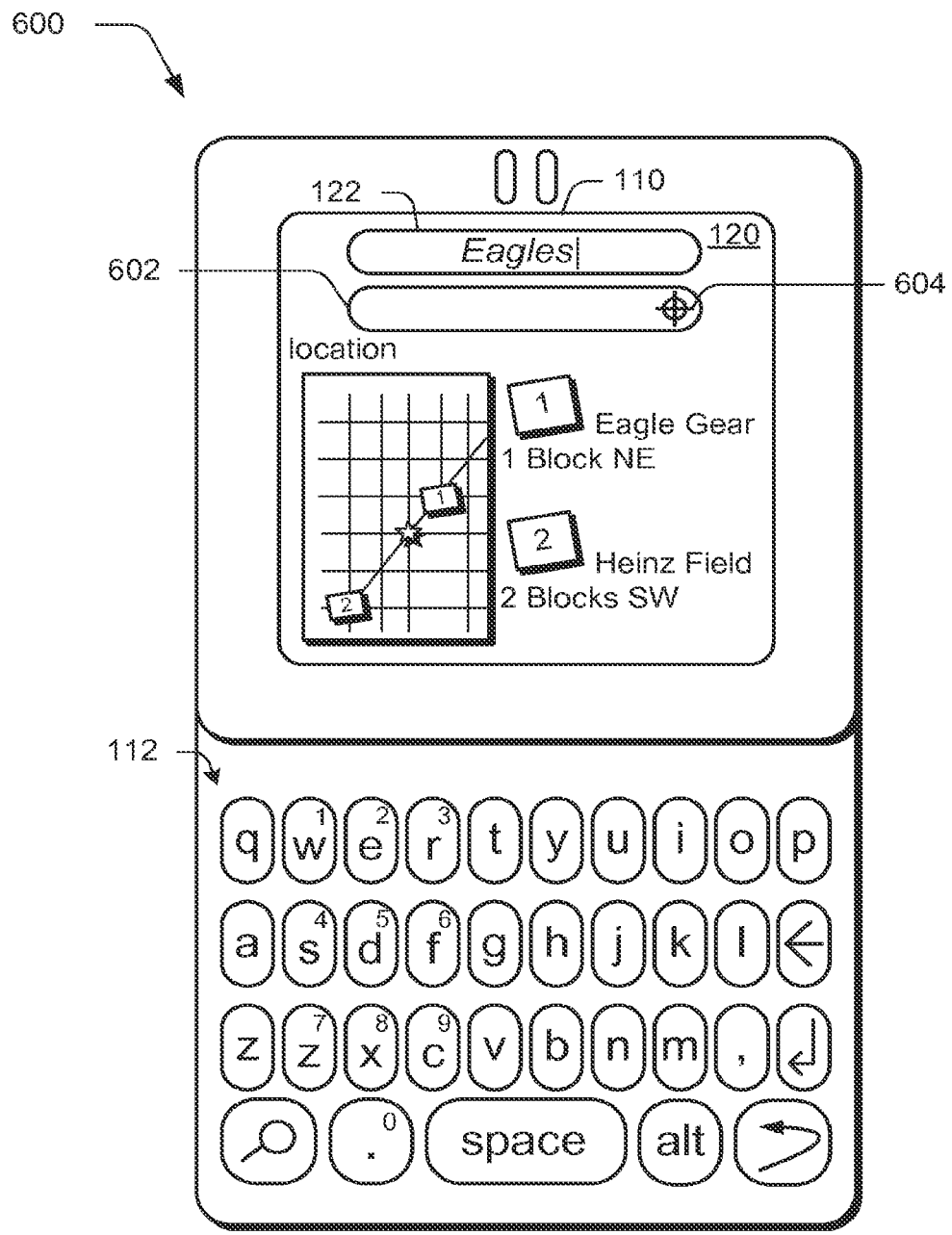
FIG. 6 illustrates an example implementation of a location context search of the user interface of die mobile communications device of FIG. 1.

FIG. 6 illustrates an example implementation of a location context search of the user interface 120 of the mobile communications device 102 of FIG. 1. The user interface 120 is shown as outputting a location context. As illustrated, the user interface 120 includes a search query input area 122 like the location context 206 of FIG. 2.

However, in this example a location portion 602 is also included for entering a location that is to be used as a basis for performing a search. For instance, a user may use the keyboard 112 to enter a location that is to be used as a basis for a search query entered in the search query input area 122. A user may also select a location icon 604 to use a current geographical location of the mobile communications device 102. Selection of the location icon 604 may case the location portion 602 to be automatically populated with the current geographical location, which may be determined through GPS, triangulation using wireless transmitters, and so on. Selection of a search result (e.g., tapping), may cause the user interface to output a view of the result on a map, e.g., in a web browser.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware or a combination of software and firmware. In the case of a software implementation, the module, functionality, or logic represents instructions (e.g., program code) that perform specified tasks when executed on a computing system formed by one or more computers having one or more processors (e.g., CPU or CPUs). The instructions may be stored in one or more tangible computer readable memory devices. The features of the contextual search techniques described below are platform-independent, meaning that the techniques may be implemented on a variety of commercial computing platforms having a variety of processors.

Example Procedures

The following discussion describes contextual search techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the implementations 200-600 of FIGS. 2-6, respectively.

Figure 7:
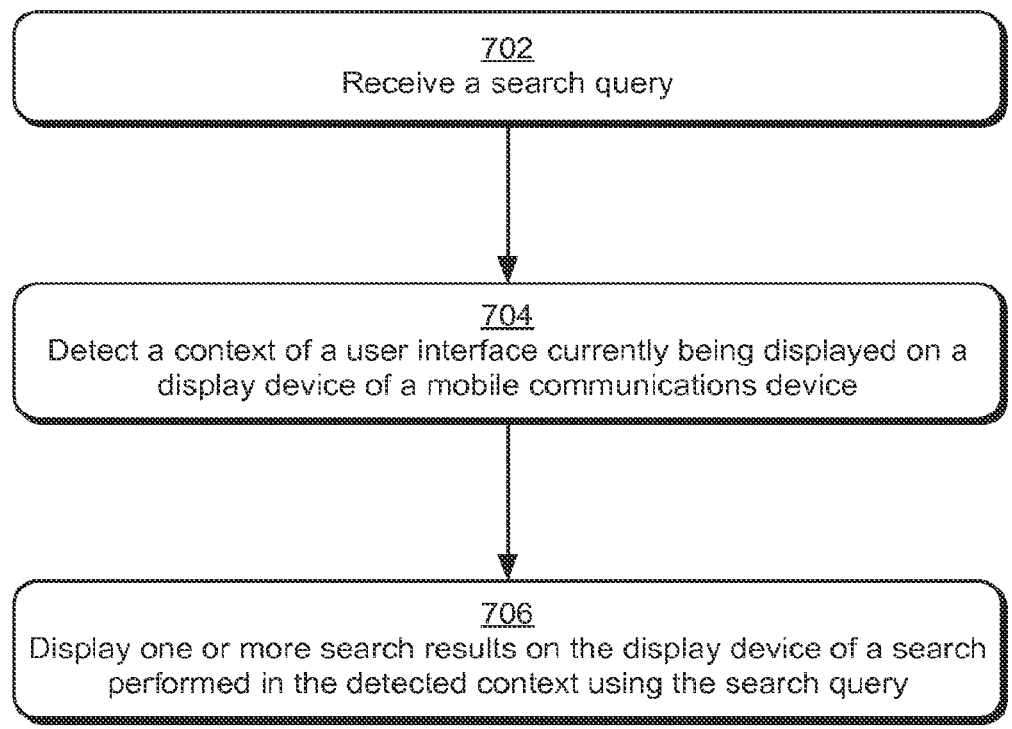
FIG. 7 is a flow diagram depicting a procedure in an example implementation in which a current context of a user interface is used to scope a search.

FIG. 7 depicts a procedure 700 in an example implementation in which a current context of a user interface is used to scope a search. A search query is received (block 702), such as through the keyboard 110 and displayed in the search query input area 122 of the user interface 120.

A context is detected of a user interface currently being displayed on a display device of a mobile communication device (block 704). For example, the display device 102 may be used to output the user interface 120 in a variety of different configurations for a variety of different applications, such as a music player application, contacts application, telephone application, web browser, location application, and so on. Accordingly, each of these different applications may provide a different context for the user interface 120, such as to display different types of content. Types of content may vary greatly, such as music, video, documents, contacts, and so on and may be detected in a variety of ways, such as based on an extension that identifies the type. Therefore, the search module 118 may leverage the current context to increase a likelihood of finding a relevant search result.

One or more search results are displayed on the display device of a search performed in the detected context using the search query (block 706). As shown in FIG. 2, for instance, search results may be displayed in a phone 202 context as a column. Contexts may also be switched by a user to perform additional searches, such as to switch from a first context to a second context as described in relation to FIG. 8 and/or "scope out" a search as described in relation to FIG. 9.

Figure 8:
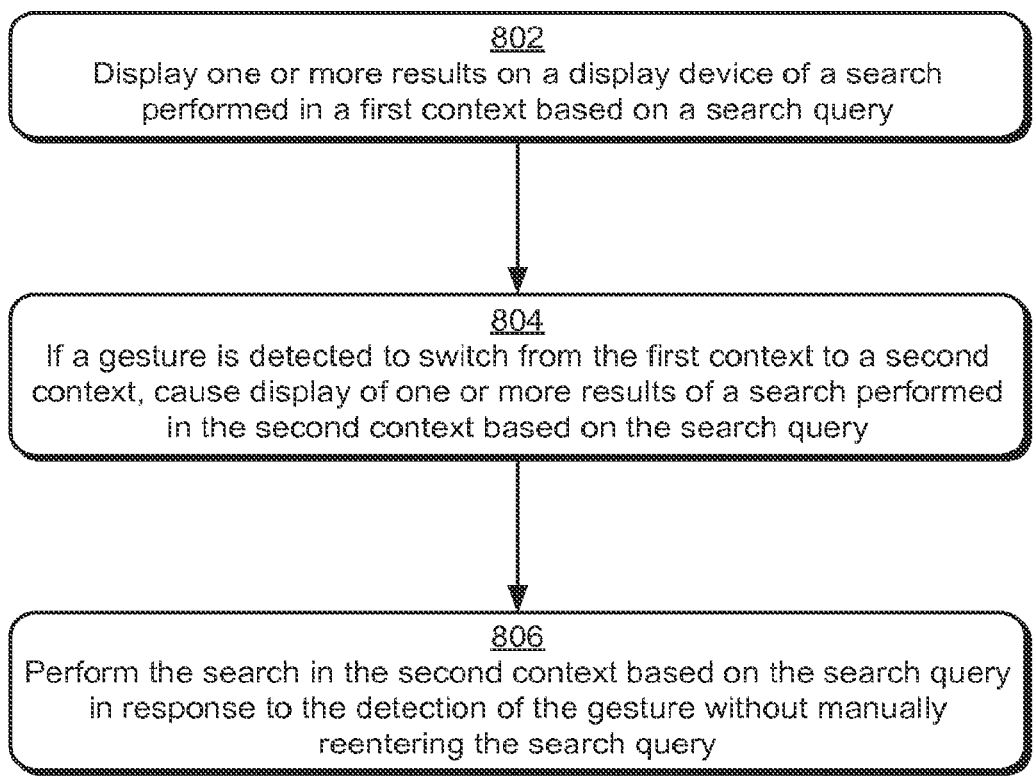
FIG. 8 is a flow diagram depicting a procedure in an example implementation in which a switch is performed between first and second contexts of a search using a gesture.

FIG. 8 depicts a procedure 800 in an example implementation in which a switch is performed between first and second contexts of a search using a gesture. One or more results are displayed on a display device of a search performed in a first context based on a search query (block 802). For example, the first context may be a phone 202 context based on a telephone application is that currently configuring the user interface 120. Accordingly, a search performed in this context may result in search results that include telephone numbers as illustrated in FIG. 2.

If a gesture is detected to switch from, the first context to a second context, cause display of one or more results of a search performed in the second context based on the search query (block 804). Additionally, the search may be performed based on the search query in response to the detection of the gesture without manually reentering the search query (block 806). Continuing with the previous example, a user may wish to switch from the phone 202 context to the location 206 context. Therefore, a finger of the users hand 208 may make a panning gesture across the display device 110. Touchscreen functionality of the display device 110 may be used to detect the gesture and therefore recognize that a switch is to be performed.

In response to this detection, the search module 118 may use the search query from the first search and perform another search in the relevant context, such as location 206 in this example. Although performance of first and second searches has been described, a variety of other examples are also contemplated. For example, the first and second searches in the respective first and second contexts may be performed concurrently (e.g., is a single search). Results of this search may then be separated based on context such that the user may navigate between the contexts to see different search results. Thus, the contexts may be searched in a variety of ways without manually reentering the search query.

FIG. 9 depicts a procedure 900 in an example implementation in which a search is scoped out to include an additional context. Search results are displayed of a first search performed in a first context based on a search query (block 902). If an input is received via a button of the mobile communications device that indicates that a scope of the first search is to be expanded, a second search is performed. The second search is performed in a second context that was not part of the first search without manual reentry of the search query (block 904).

For example, a dedicated search key 132 of a keyboard 112 of the mobile communications device 102 may be pressed to load the search query input area 122. When the search key 132 was pressed, the mobile communications device 102 may be in a phone 128 context and accordingly a search is performed in that context. However, a user may have mistakenly entered the search query while in the phone 128 context and desire another context, such as music. Accordingly, the user may press the back 132 button to scope out to search the mobile communications device 102 as a whole and not just phone numbers. Pressing the back 132 button again may cause the search to be expanded past local storage of the mobile communications device 102 to include content available remotely over the network 116. A variety of other examples are also contemplated.

Example Device

Figure 10:
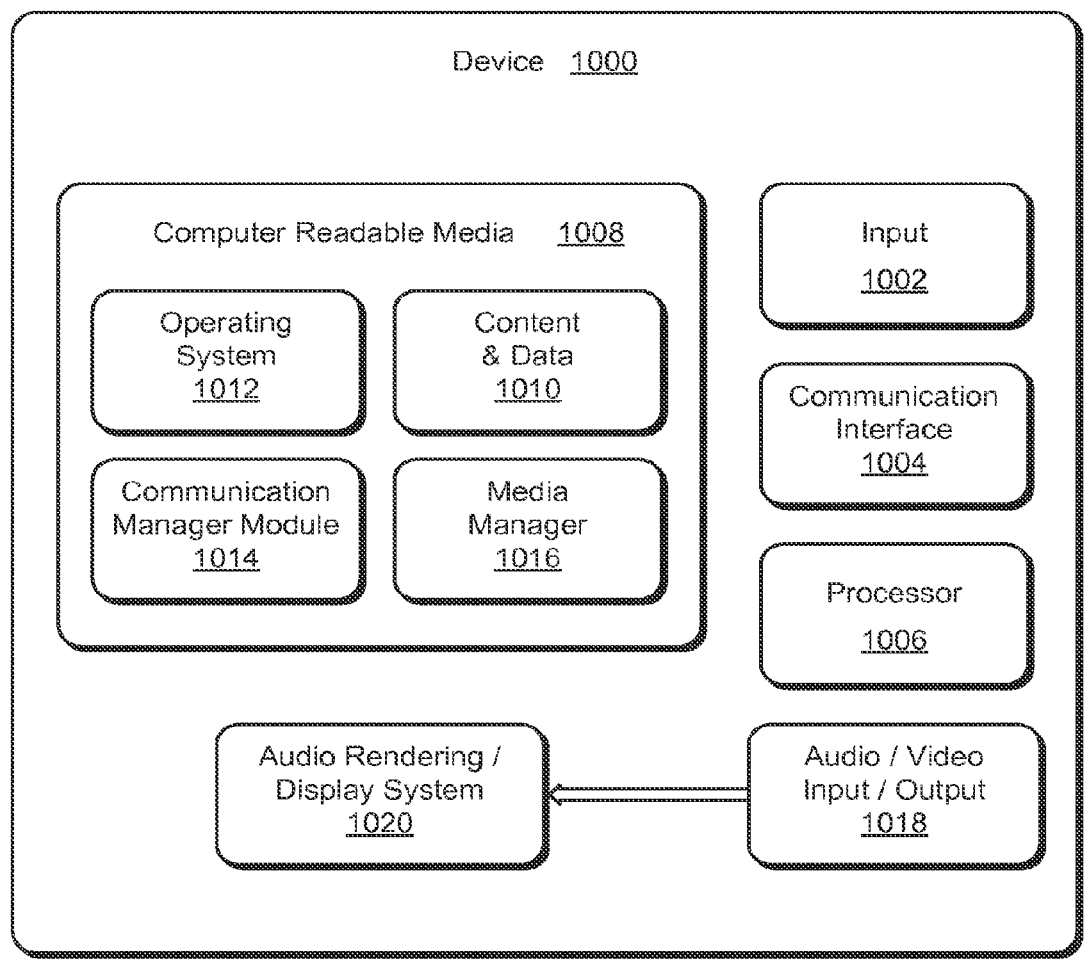
FIG. 10 illustrates various components of an example device that can be implemented in various embodiments as any type of a mobile device to implement embodiments of devices, features, and systems for mobile communications.

FIG. 10 illustrates various components of an example device 1000 that can be implemented in various embodiments as any type of a mobile device to implement embodiments of devices, features, and systems for mobile communications. For example, device 1000 can be implemented as any of the mobile communications devices 102 described with reference to respective FIGS. 1-6. Device 1000 can also be implemented to access a network-based service, such as a content service.

Device 1000 includes input(s) 1002 that may include Internet Protocol (IP) inputs as well as other input devices, such as the keyboard 112 of FIGS. 1-60. Device 1000 further includes communication interface(s) 1004 that can be implemented as any one or more of a wireless interface, any type of network interface, and as any other type of communication interface. A network interface provides a connection between device 1000 and a communication network by which other electronic and computing devices can communicate data with device 1000. A wireless interface enables device 1000 to operate as a mobile device for wireless communications.

Device 1000 also includes one or more processors 1006 (e.g., any of microprocessors, controllers, and the like) which process various computer-executable instructions to control the operation of device 1000 and to communicate with other electronic devices. Device 1000 can be implemented with computer-readable media 1008, such as one or more memory components, examples of which include random access memory (RAM) and non-volatile memory (e.g., any one or more of a read-only memory (ROM), flash memory, EPROM, EEPROM, etc.).

Computer-readable media 1008 provides data storage to store content and data 1010, as well as device applications and airy other types of information and/or data related to operational aspects of device 1000. For example, an operating system 1012 can be maintained as a computer application with the computer-readable media 1008 and executed on processor(s) 1006. Device applications can also include a communication manager module 1014 (which may be used to provide telephonic functionality) and a media manager 1016.

Device 1000 also includes an audio and/or video output 1018 that provides audio and/or video data to an audio rendering and/or display system 1020. The audio rendering and/or display system 1020 can be implemented as integrated component(s) of the example device 1000, and can include any components that process, display, and/or otherwise render audio, video, and image data. Device 1000 can also be implemented to provide a user tactile feedback, such as vibrate and haptics.

The communication manager module 1014 is further illustrated as including a keyboard module 1022. The keyboard module 1022 is representative of functionality employ one or more of the techniques previously described in relation to FIGS. 1-6.

Generally, the blocks may be representative of modules that are configured to provide represented functionality. Further, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices. The features of the techniques described above are platform-independent, meaning that the techniques may be implemented on a variety of commercial computing platforms having a variety of processors.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
    generating for display a first portion of search results of a first search based on a search query performed in a first context that involves a first application;
    in response to a command from a user to scroll past the first portion of the search results, generating for display a second portion of the search results of the first search, wherein the second portion of the search results of the first search comprises an end of the search results of the first search;
    determining that the user has scrolled past the end of the search results of the first search; and
    in response to a user scrolling past the end of the search results of the first search, performing a second search in a second context that involves a second application which was not part of the first search, the second search being performed without manual reentry of the search query.

2. The method of claim 1, wherein the first search is for content that is local to a mobile communications device and the second search is for content that accessible to the mobile communications device via a network connection.

3. The method of claim 1, wherein scrolling past the end of the search results of the first search causes the second search to expand past a local storage to include content available remotely over a network.

4. The method of claim 1, wherein at least one of the first and the second searches involves at least a portion of a telephone number.

5. The method of claim 1, wherein the first context is user selectable through interaction with a user interface.

6. The method of claim 1, wherein generating for display the search results of the first search comprises generating for display the search results of the first search in a plurality of categories.

7. The method of claim 1, wherein the first context and the second context each correspond to a respective application stored in storage, further comprising:
    retrieving, from the storage, data associated with the second application;
    cross-referencing the retrieved data with the search query;
    determining, based on the cross-referencing, a subset of the data associated with the second application that matches the search query; and
    generating for display a representation of the subset of the data.

8. The method of claim 1, further comprising associating content with the first context based on an extension type.

9. The method of claim 1, further comprising generating for display search results of the second search on the display.

10. A system comprising:
    hardware circuitry configured to:
        generate for display a portion of search results of a first search based on a search query performed in a first context that involves a first application;
        in response to a command from a user to scroll past the first portion of the search results, generate for display a second portion of the search results of the first search, wherein the second portion of the search results of the first search comprises an end of the search results of the first search;

determine that the user has scrolled past the end of the search results of the first search; and in response to a user scrolling past the end of the search results of the first search, perform a second search in a second context that involves a second application which was not part of the first search, the second search being performed without manual reentry of the search query.

11. The system of claim 10, wherein the first search is for content that is local to a mobile communications device and the second search is for content that accessible to the mobile communications device via a network connection.

12. The system of claim 10, wherein scrolling past the end of the search results of the first search causes the second search to expand past a local storage to include content available remotely over a network.

13. The system of claim 10, wherein at least one of the first and the second searches involves at least a portion of a telephone number.

14. The system of claim 10, wherein the first context is user selectable through interaction with a user interface.

15. The system of claim 10, wherein the hardware circuitry is configured to generate for display the search results of the first search by generating for display the search results of the first search in a plurality of categories.

16. The system of claim 10, wherein the first context and the second context each correspond to a respective application stored in storage, and wherein the hardware circuitry is further configured to:

retrieve, from the storage, data associated with the second application;

cross-reference the retrieved data with the search query;

determine, based on the cross-referencing, a subset of the data associated with the second application that matches the search query; and generate for display a representation of the subset of the data.

17. The system of claim 10, wherein the hardware circuitry is further configured to associate content with the first context based on an extension type.

18. The system of claim 10, wherein the hardware circuitry is further configured to generate for display search results of the second search on the display.

\* \* \* \* \*